United States Patent [19]

Oravetz et al.

[11] Patent Number: 5,872,722
[45] Date of Patent: Feb. 16, 1999

[54] APPARATUS AND METHOD FOR ADJUSTMENT AND COORDINATION OF CIRCUIT BREAKER TRIP CURVES THROUGH GRAPHICAL MANIPULATION

[75] Inventors: David M. Oravetz, Coraopolis; Ming-Horng Lee, Moon Township, both of Pa.

[73] Assignee: Eaton Corporation, Cleveland, Ohio

[21] Appl. No.: 806,034

[22] Filed: Sep. 4, 1996

[51] Int. Cl.$^6$ .............................. H02H 3/00; G06G 7/62
[52] U.S. Cl. .................. 364/528.27; 345/440; 345/339; 345/970; 361/187
[58] Field of Search .................................... 364/492, 188, 364/474.22, 481, 483, 528.27, 528.28, 528.29; 35/145, 339, 440, 970; 361/187

[56] References Cited

U.S. PATENT DOCUMENTS

| | | | |
|---|---|---|---|
| 4,245,318 | 1/1981 | Eckert et al. | 364/481 |
| 4,331,997 | 5/1982 | Engel et al. | 361/93 |
| 4,351,012 | 9/1982 | Elms et al. | 364/483 |
| 4,351,013 | 9/1982 | Matsko et al. | 364/483 |
| 4,752,853 | 6/1988 | Matsko et al. | 364/481 |
| 4,827,369 | 5/1989 | Saletta et al. | 364/483 |
| 4,937,757 | 6/1990 | Dougherty | 364/492 |
| 4,967,304 | 10/1990 | Dougherty | 364/483 |
| 5,168,441 | 12/1992 | Onarheim et al. | 364/188 |
| 5,440,681 | 8/1995 | Kudo | 345/440 |
| 5,513,309 | 4/1996 | Meier et al. | 345/339 |
| 5,553,212 | 9/1996 | Etoh et al. | 345/440 |
| 5,576,946 | 11/1996 | Bender et al. | 364/188 |
| 5,657,221 | 8/1997 | Warman et al. | 364/188 |
| 5,689,284 | 11/1997 | Herget | 345/145 |

OTHER PUBLICATIONS

Power*Tools™ Electrical Engineering Software. Captor® Computer Aided for Time Overcurrent Reporting. SKM Analysis, Inc. dated Feb. 8, 1995, pp. i, ii; 1–1 through 1–8; 5–1 through 5–22; and 10–1 through 10–58.

CYME International Inc. CYMTCC for Windows, Software for Protective Device Coordination, including CYMEIGEN, CYMHARMO and CYMCOORD TCCURVE. Printed Aug. 1994.

CYMTCC User's Guide & Reference Manual, dated Aug. 1995.

EDSA Device Coordination, Network Intelligent. EDSA Power System Analysis Software. Date unknown.

Westinghouse Electric Corporation. Digitrip MV Trip Unit. Descriptive Bulletin 33–750, dated Nov. 1993.

Primary Examiner—Eric W. Stamber
Attorney, Agent, or Firm—Martin J. Moran

[57] ABSTRACT

The trip curves of circuit protection devices in an electric power distribution system are individually adjusted and coordinated in a hierarchy of protection devices by graphical manipulation, such as by dragging with a mouse, segments of the trip curves presented on a display device. The existing parameter settings can be provided to the display device and the adjusted parameter settings returned to the protection devices manually, but preferably, a communications network provides automatic transfer of the settings in both directions.

16 Claims, 8 Drawing Sheets

APPARATUS AND METHOD FOR ADJUSTMENT AND COORDINATION OF CIRCUIT BREAKER TRIP CURVES THROUGH GRAPHICAL MANIPULATION

BACKGROUND OF THE INVENTION

1. Field of the Invention

This invention relates to adjustment of the protection curves of electric circuit protection devices such as circuit breakers and overload relays, and for coordinating the protection curves of a hierarchy of such protection devices.

2. Background Information

Protection devices such as circuit breakers and overload relays in electric power distribution systems interrupt the current if certain current/time characteristics are exceeded. Specifically these protection devices have a rated current which can be maintained indefinitely. Very high currents, many times in excess of the rated current of the device, such as those associated with a short circuit, result in an instantaneous trip. Some loads, such as electric motors during start-up, draw currents in excess of rated current for a period of time. Such temporary overcurrents must be tolerated if such loads are present. However, if the motor is stalled or the overcurrent otherwise persists, the current must be interrupted to protect the load and the power conductor from overheating. The long delay trip function permits such temporary overcurrent conditions. If the current exceeds a long delay pick-up value, a long delay timing function is initiated. The time to the delayed trip is usually associated with the type of load, for instance the period of overcurrent expected for the class of the electric motor. Typically, the trip curve is set for a trip to occur if the current remains at or above a specified factor, such as 3 to 6 for instance, times the rated current for the long delay time period. However, if the current remains above the long delay pick-up value but below the selected factor times the rate of current, a trip will occur at a time which is an inverse function of the magnitude of the overcurrent. Various inverse time functions can be used, but most commonly an $I^2t$ function (where I is the current and t is the time in seconds) is used.

Typically, projection devices are provided at several levels in the electric power distribution system. Thus, a main circuit breaker is used in the main bus and additional circuit breakers are provided in the feeder circuits and typically in the branch circuits also, the later of which may further include an overload relay and a starter for a motor. This creates a hierarchy of protection devices with the main circuit breaker at the top and the branch circuit breakers or the overload relays at the bottom. It is desirable to have the lowest circuit breaker possible in the hierarchy respond to a fault or overcurrent condition to minimize disruption of service. This requires coordination of the operation of the protection devices which is implemented by a short delay trip function. The short delay trip function allows a circuit breaker to tolerate an overcurrent of a magnitude which is greater than the long delay pick-up value but less than the instantaneous trip value for a short interval of time in order to allow a lower circuit breaker in the hierarchy to respond.

Coordination of the trip curves of the circuit breakers in an electric power distribution system has traditionally been implemented by drawing the protection curves for the circuit breakers on separate transparencies which are overlaid. If satisfactory margins between the overlaid curves do not exist, the parameters of the affected circuit breakers are adjusted and replotted until satisfactory margins are realized. This coordination process requires a highly skilled engineer. The various parameter values for each of the circuit breakers are given to a technician who enters them into the respective devices. This process is time consuming, costly, and subject to human error.

It is known to display individual trip curves on a computer monitor where the curve can be adjusted by textual entries of the various parameters. Separately, it is known to download circuit breaker parameter values from a remote computer using network communications. This potentially reduces the human errors associated with inserting the correct parameter values in the correct circuit breaker. However, there is no comprehensive system or process for improving the integrity and reducing the required time and cost of coordinating the trip curves of protection devices in an electric power distribution system.

Hence, there remains a need for improved apparatus and a method for coordinating the trip curves of the protection devices in an electric power distribution system.

More particularly, there is a need for such an improved method and apparatus which improves the integrity of the coordination of the protection devices while reducing the cost, time and number and skill of personnel required.

There is also a need for improved apparatus and a method for adjusting the trip curve of an individual circuit breaker.

SUMMARY OF THE INVENTION

These needs and others are satisfied by the invention which is directed to the apparatus for adjusting a trip curve for a protection device in an electric power distribution system, which includes means for generating a graphical display of the trip curve on display means using the parameter settings which define the trip curve. The trip curve is adjusted by adjusting means for graphically manipulating the graphical display to generate an adjusted trip curve and adjusted parameter settings. Output means then output the adjusted parameter settings defining the adjusted trip curve. The adjusting means for graphically manipulating the graphical display comprises means for dragging the graphical display of the trip curve across the display means. Where the trip curve is made up of a plurality of segments, the means for dragging the trip curve includes means selecting a segment of the trip curve for dragging, and the adjusting means includes means adjusting the other segments of the trip curve to accommodate for the dragging of the selected segment. The adjusting means includes means limiting movement of the selected curve segment to limiting values for the parameter settings. Furthermore, where the parameter settings have discrete values, the adjusting means adjusts the adjusted parameter settings to the closest discrete parameter setting for the selected segment. The adjusting means further includes means for graphically manipulating sloped segments of a trip curve to adjust the slope parameter setting.

The invention is particularly suited for coordinating trip curves for a plurality of protection devices. Thus, the graphical display generates a graphical display for each of the trip curves to be coordinated on the display means simultaneously and the adjusting means can be used for graphically manipulating the graphical display of at least one of the trip curves to adjust the one trip curve and the associated parameter settings to provide a margin between the trip curves.

The invention may further include communication means for transferring the parameter settings from the protection device to the means for adjusting the trip curve and for retransferring the adjusted parameter settings back to the protection device to provide an adjusted trip curve for the protection device. Similarly, in the case of coordinating trip curves for multiple protection devices, the parameter settings for each of the devices can be provided to the adjusting means which is used to graphically manipulate the curves to provide the selected coordination, with the adjusted parameters then communicated over the communications network back to the respective protection devices.

The invention further encompasses the method of coordinating trip curves for a plurality of protection devices in an electric power generation system, which includes the steps of storing stored values of the parameter settings for each of the trip curves, generating on a display device simultaneous graphical representations of at least two of the trip curves from the stored values of the parameter settings, graphically manipulating the graphical representation of at least one of the trip curves to an adjusted position to provide margins between the trip curves, updating the stored values of the parameter settings to adjusted values produced by the adjusted position of the trip curves, and inserting the adjusted values of the parameter settings into the protection devices. Where the trip curves comprise a series of line segments, the step of graphically manipulating a trip curve comprises dragging one of the line segments on the display to an adjusted position. The method further includes transmitting the adjusted stored values of the parameter settings to the protection devices over network communications, as well as obtaining the parameter settings from the protection devices over the communications network for storage.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
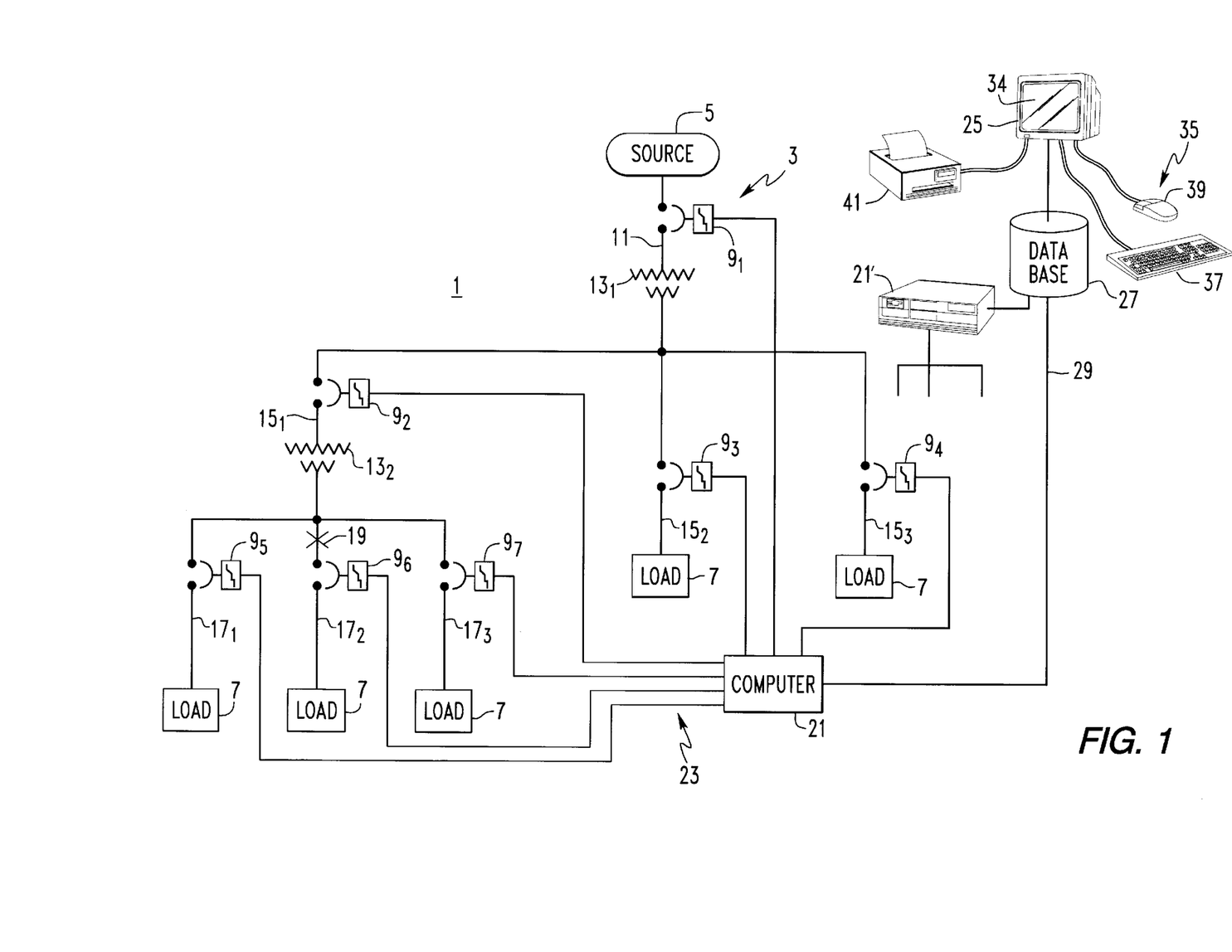
FIG. 1 is a one-line diagram of an electrical distribution system incorporating the invention.

FIG. 1, is a one-line diagram of an electric power distribution system 1 to which the invention has been applied. This power system 1 includes a hierarchy 3 of circuit breakers providing electric power supplied by a source 5 such an electric utility to a number of loads 7. The hierarchy 3 of circuit breakers includes a main circuit breaker $9_1$ in the main bus 11 connected to the source 5. The main bus 11 supplies power through a step-down transformer $13_1$ to a number of branch buses $15_1$–$15_3$. In the system illustrated, in the branch bus $15_1$ further supplies power through another step down transformer $13_2$ to a number of load buses $17_1$–$17_3$. Branch circuit breakers $9_2$–$9_4$ are provided in the branch buses $15_1$–$15_3$, respectively, and additional circuit breakers $9_5$–$9_7$ are provided in the load buses $17_1$–$17_3$, respectively. Each of the circuit breakers 9 contains a trip unit having a number of parameter settings which define a trip curve representing the protection provided by the circuit breaker in a manner well known in the art. The trip curves of the various circuit breakers 9 are coordinated such that the closest circuit breaker 9 in the hierarchy 3 of circuit breakers above a particular fault responds to that fault to minimize disruption of the distribution system. Thus, if a fault occurs at the point 19 in the load bus $17_2$, above the circuit breaker, the circuit breaker $9_2$ should respond to isolate the portion of the power system 1 affected while leaving the other portions of the system served by the branch buses $15_2$ and $15_3$ in service.

In the preferred embodiment of the invention, this coordination of the trip curves of the circuit breakers 9 is implemented using a digital computer 21, which is connected to the individual circuit breakers 9 through a communications network 23. An arrangement in which the computer 21 monitors the operations of the individual circuit breakers and can be used to set parameters in the circuit breakers is known. This known system does not provide for coordinating operation the circuit breakers. That task is performed off-line in the manner of the prior practice discussed above. The settings then can be implemented through the use of the computer 21 or manually.

While in accordance with the invention, the computer 21 could be used to coordinate the various circuit breakers 9, it is further contemplated that the computer 21 can be connected with a common computer 25 served by a large data base 27 through an additional communications link 29. Such a central computer 25 could be located, for instance, at a vendor's site which is linked through the communications link 29 to an additional computer system 21' serving other electrical distribution systems (not shown) similar to the system 1. In this manner, a single computer 25 at a manufacturer's plant could be used to automatically coordinate the circuit breakers in electrical distribution systems 1 for a number of customers.

It is not required that the computer which performs the trip curve coordination be linked to the individual circuit breakers. Instead, the parameters needed by the computer for coordinating the trip of curves can manually be gathered and input to the computer by a technician who then returns the coordinated settings to the individual circuit breakers. However, it is preferred that the computer be linked to the individual circuit breakers to automatically gather current settings and distribute the coordinated settings to reduce the possibility of human error and to reduce the time required to complete the tasks.

Figure 2:
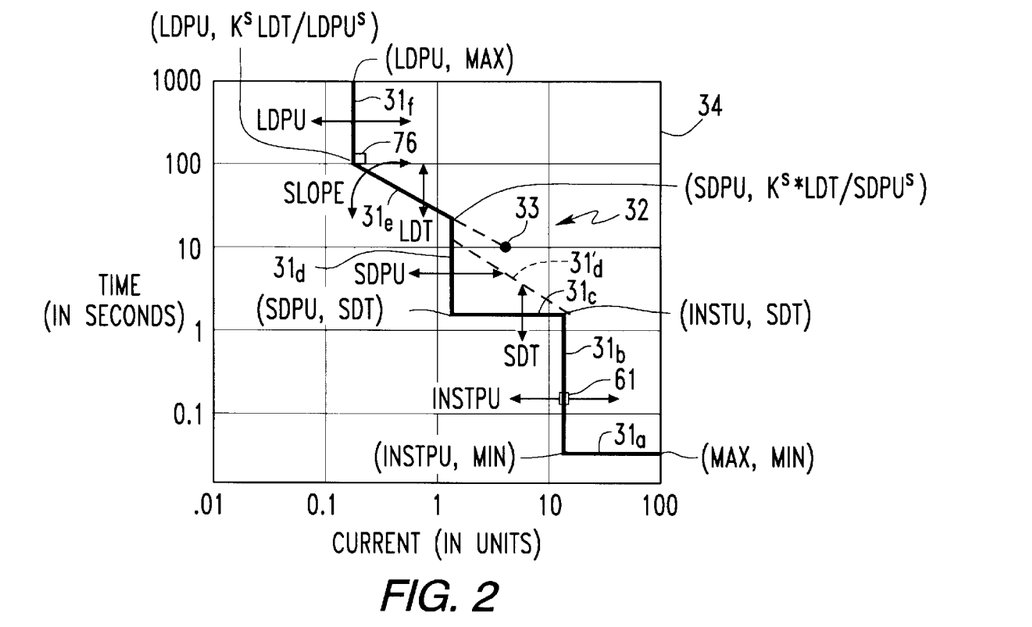
FIG. 2 is a graphical presentation of a trip curve illustrating the protection provided by circuit breakers in the electric power distribution system of FIG. 1.

FIG. 2 illustrates a generalized trip curve 31 for one of the circuit breakers 9. The trip curve is a logarithmic plot of per unit current on the abscissa and time in seconds on the ordinate. Typically, the per unit current is normalized to the rated current of the circuit breaker. The trip curve when plotted on the log-log scale comprises a number of line segments. The segment $31_a$ indicates the instantaneous response time of the breaker which is a function of the mechanical limitations of the mechanism. The vertical segment $31_b$ is the instantaneous pick-up current by which the circuit breaker responds immediately to very high over current conditions, such as would be caused by a short circuit. Typically, the instantaneous pick-up current is a sizeable multiple of the rated current. Thus, in the example, the instantaneous pick-up current is about 11 per unit.

In addition to the instantaneous trip, the circuit breaker will have one, and often two, delayed trips. As discussed, a long delay trip responds to overcurrents which persists for a substantial period of time. Typically, the long delay trip can be set for a multiple of the rated current for a selected period of time. As discussed above, this can be based on the type of load such as the class of a motor. A typical long delay trip setting is 6 times the rated current for, for instance, ten seconds. Such a long delay trip setting is shown at point 33 in FIG. 2. As also previously discussed, the long delay trip is provided to protect against overheating of the conductors and/or the load. If the long delay merely responds to a current in excess of the selected factor times the rated current for a given time interval, a current just below this value could persist indefinitely without tripping the circuit breaker even through excessive heat was being generated. In order to make the long delay trip responsive to such conditions, a time dependent function which better reflects the phenomenon of conductor heating is used. Thus, it is common for the long delay trip to be an $I^2t$ function. Such a function is represented by a sloped segment such as the segment $31e$ in FIG. 2. The trip unit begins to calculate the function $I^2t$ when the current exceeds a long delay pick-up value $31_f$. As can be seen from FIG. 2, the segment $31_e$, when extended passes through the point 33, which as it will be recalled, represents a current of 6 times rated current which has persisted for the long delay time, e.g., 10 seconds. However, in the circuit breaker shown, this point will never be reached because the short delay trip will trip the circuit breaker first. The short delay trip occurs when the current represented by the segment $31_d$, which is the short delay pick-up value, persists for the short delay time represented by the segment $31_c$. This short delay trip could also be a time dependent function as in the case of long delay trip. Thus, the dashed line $31_d$ illustrates the use of an $I^2t$ for the short delay trip. It can be appreciated that the long delay trip could be a non-time dependent function linear function, at which it would be represented by a step similar to that shown in FIG. 2 for the short delay trip. Other time dependent functions can be used for the delayed trips, for instance, It, $I^4t$, or others.

As can be appreciated from FIG. 2, each of the straight line segments of the trip curve 31 is defined by its end points. The coordinates for the end points are shown on FIG. 2 where the first coordinate is the current on the horizontal scale and the second is the time coordinate on the vertical axis. Thus, the coordinates for the right hand point of the segment $31_a$ are the maximum value of current, and the minimum response time for the circuit breaker, while the coordinates of the left hand end of the segment $31_a$ are the instantaneous pick-up current and again the minimum response time. The latter are also the coordinates of the lower point of the segment $31_b$. The coordinates for the upper end of the segment $31_b$ and the end coordinates for the segment $31_c$ are self evident. The time coordinates for the ends of the segment $31_e$ are generated by the indicated formulas where the power s is the power to which I is raised in the function used. Thus, in the example where the $I^2t$ function was used, s would be said equal to 2.

Under current practice for determining proper coordination of a hierarchy of circuit breakers, a skilled person uses the parameters obtained from the various circuit breakers to plot the trip curve 31 for each of the separate circuit breakers on a separate piece of transparent paper. The curves must be plotted to a common reference which takes into account the different current ratings of the individual breakers, and must also properly take into account the effects of any transformers between the circuit breakers. By adjusting the trip setting so that the trip curves for the circuit breakers lower in the hierarchy are to the left and below those circuit breakers higher in the hierarchy, it is assured that the lowest circuit breaker above a fault will respond first.

Figure 3:
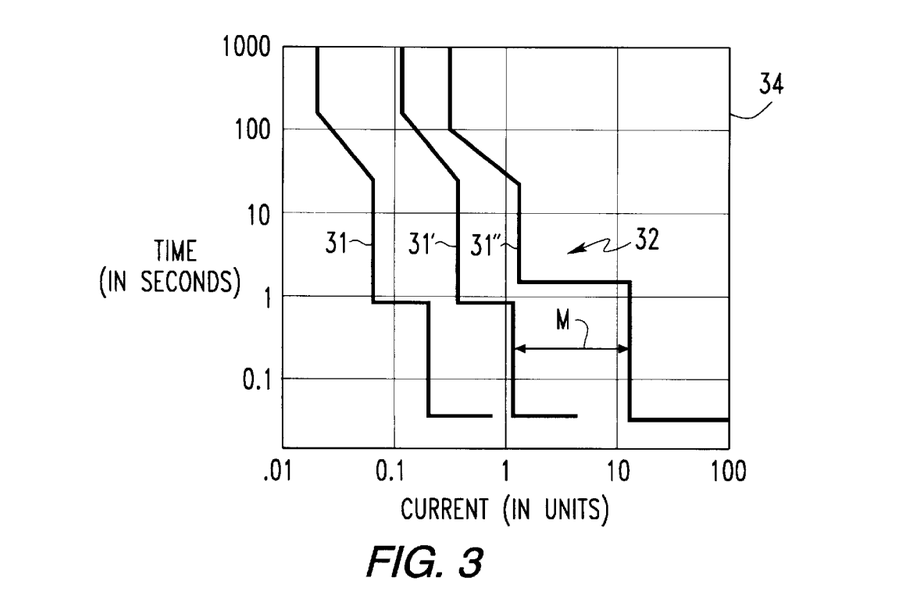
FIG. 3 illustrates coordination of curves of multiple circuit breakers.

In accordance with the invention, the trip curves 31 of multiple circuit breakers 9 in a hierarchy 3 of circuit breakers of an electric power distribution system 1 are simultaneously presented as a graphical display 32 on a display screen 34 such as is shown in FIG. 3 where the curve 31 is for the lowest circuit breaker in the path being examined, 31' is the trip curve for an intermediate circuit breaker and 32" is the trip curve for the highest circuit breaker. In the example shown, proper coordination is provided as the trip curve 31 for the lowest device in the hierarchy is to the left and below the trip curve 31' of the intermediate device which in turn is to the left and below the trip curve 31" for the highest device. If it is desired to change the coordination, such as by changing the margins, e.g., M, between the curves, or for some other reason to change one or more of the curves, the user can graphically manipulate the segments of the selected trip curve to effect changes. Thus, referring again to FIG. 1, the computer 25 is provided with user input devices 35 which can include a keyboard 37 and a device such as a mouse or a track ball 39. The central computer 25 can also be provided with a printer 41 for providing hard copy of the parameter settings. These may be used by a technician to manually set parameters in the various circuit breakers in place of automatic updating of parameters using the communications network 29.

Figure 4:
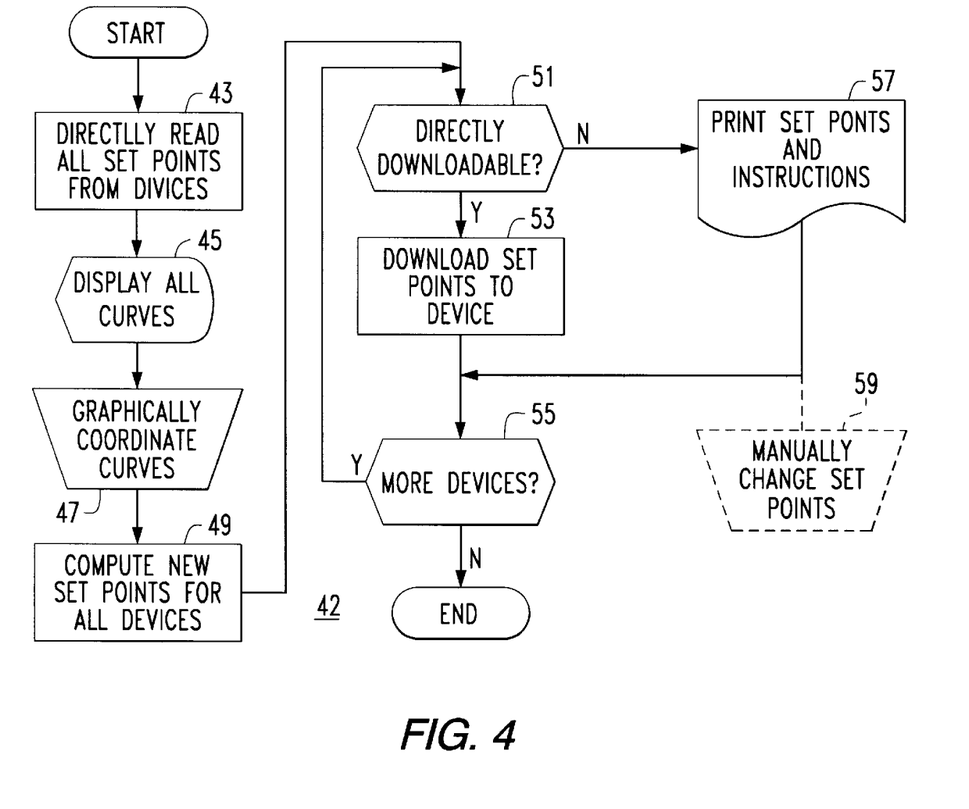
FIG. 4 is a flow chart of a main routine for implementing graphical coordination of trip curves in accordance with the invention.

FIG. 4 is a flow chart illustrating the main routine 42 used by the computer 25 in adjusting and coordinating the trip curves of one to all of the circuit breakers 9. All of the set point values from the various devices are read at 43. All of the trip curves for a selected path in the hierarchy of circuit breakers are simultaneously displayed on the display screen 34 of the computer 25 at 45. The curves are then graphically coordinated at 47. As will be seen, this graphical coordination is implemented by the operator by using the mouse or track ball 39 to drag portions of the trip curve 31, a segment at a time, to a new desired position. In the illustrative embodiment of the invention, the curved segments can only be positioned to locations corresponding to the discrete settings provided in the circuit breaker. As a curve is dragged to a new location, the new set points for the devices are computed at 49. If the circuit breaker is connected through the network and communications link 29 so that the new set points can be downloaded automatically as determined at 51, the new set points are distributed at 53. This process is repeated for each of the circuit breakers at 55. If any of the circuit breakers is not configured to automatically receive revised set point values, the appropriate set points and accompanying instructions to a technician are printed by printer 41 at 57. A technician then takes the printout to the circuit breaker and manually inserts the new values as indicated at 59. This action is independent of the main routine 41.

In adjusting a segment 31$_b$–31$_f$ the operator places the cursor 61 over the segment to be moved preferably by clicking the mouse 39. As can be seen from FIG. 2, the vertical segment 31$_b$ which sets the instantaneous pick-up value, segment 31$_d$ which sets the short delay pick-up value and the vertical segment 31$_f$ which sets the long delayed pick-up value can be manipulated by movement in a horizontal direction. The horizontal segments, which in the illustrative trip curve constitutes only the segment 31$_c$ which sets the short delay time value, is manipulated through vertical movement. The diagonal segment 31$_e$ can be manipulated through vertical movement to set the long delay time value, and can also be rotated to change the slope. As discussed previously, the change in slope affects the function used in determining the long delay trip point, e.g., It, I$^2$t or I$^4$t.

Figure 5:
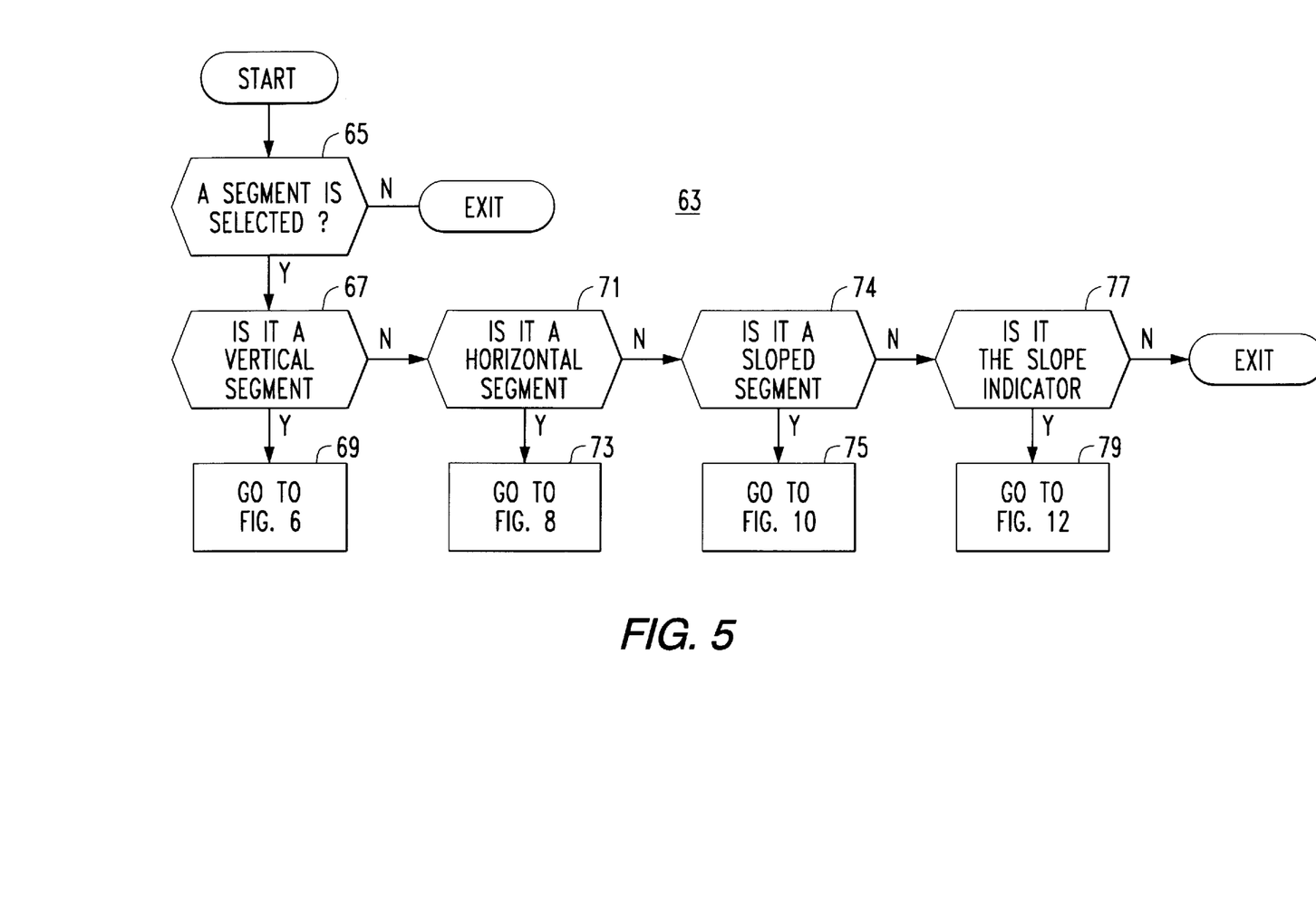
FIG. 5 is a flow chart of a routine for determining the type of segment of the trip curve to be manipulated.
Figure 6:
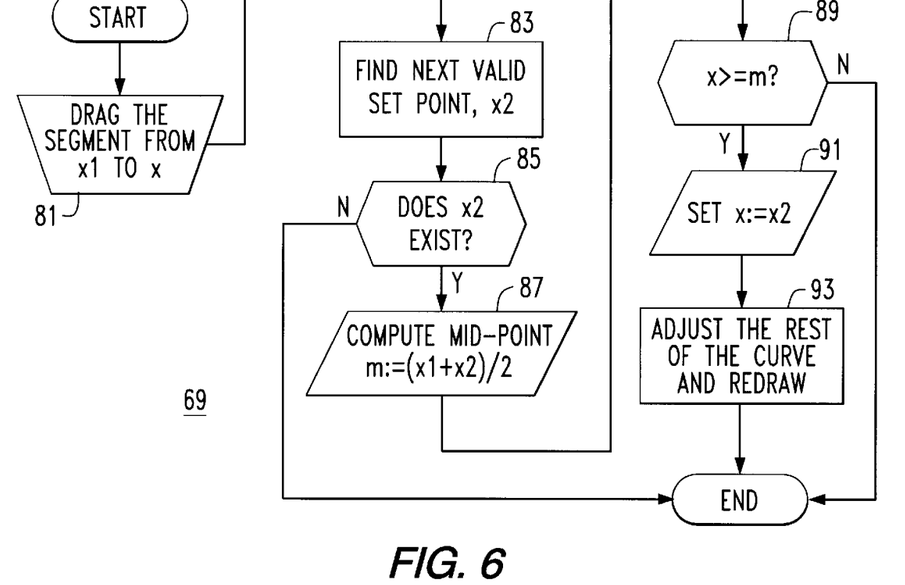
FIG. 6 is a flow chart of a routine for effecting horizontal movement of a vertical segment of a trip curve.
Figure 8:
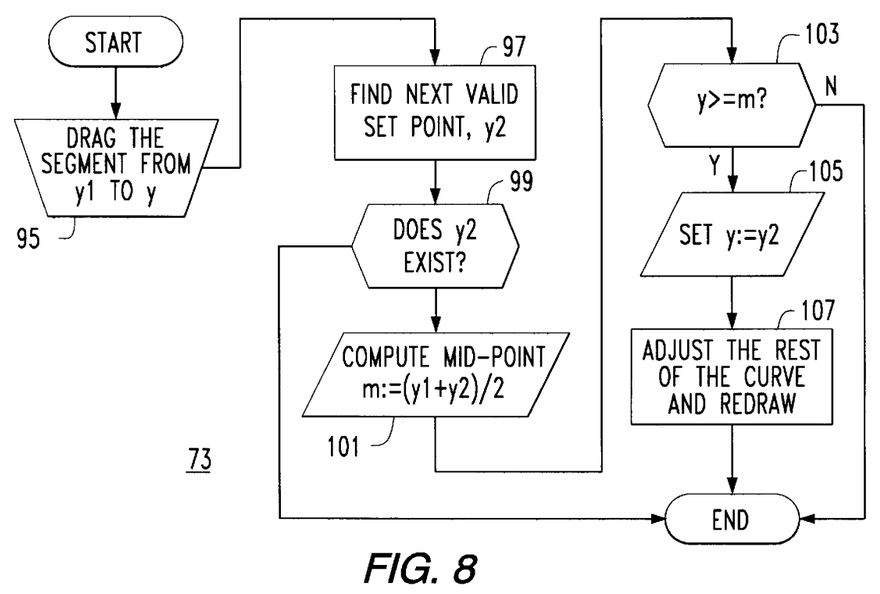
FIG. 8 is a flow chart of a routine for effecting vertical movement of a horizontal segment of a trip curve.
Figure 10:
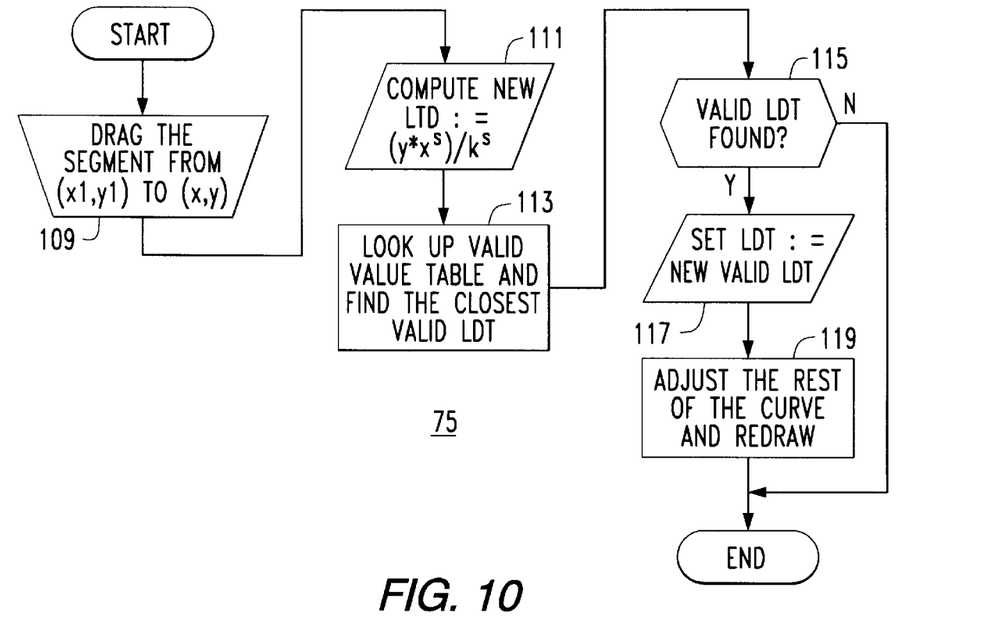
FIG. 10 is a flow chart of a routine for effecting movement of a sloped segment of a trip curve.
Figure 12:
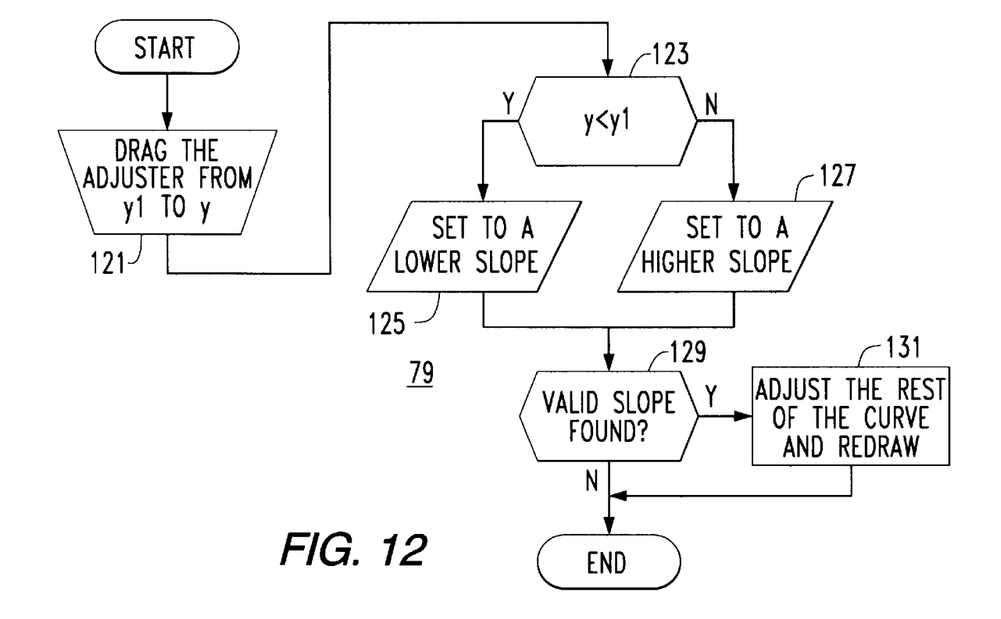
FIG. 12 is a flow chart of a routine for effecting a change in the slope of a sloped segment of a trip curve using the routine of FIG. 12.

The routine 63 used for initiating adjustment of a trip curve 31 is shown in FIG. 5. Typically, a circuit breaker has discrete settings for the pick-up values and time delays. Thus, the appropriate section of the segment of the curve must be dragged more than half way toward the next discrete setting in order for a change in the pick-up value to be effected. As shown in FIG. 5, the routine 63 repetitively checks to see if a curve segment is selected at 65. If a vertical segment is selected as indicated at 67, the horizontal movement routine 69 illustrated in FIG. 6 is called. If the selected segment is a horizontal segment as determined at 71 then the vertical movement routine 73 of FIG. 8 is selected. If the sloped segment is selected at 74, the sloped segment movement routine 75 illustrated in FIG. 10 is called. The time dependent function, such as for long delay trip, can be changed by adjusting the slope of that segment of the curve 31$_e$. In order to change the slope, the user clicks on the indicator 76 represented by a square in FIG. 2. When selection of the slope is detected at 77 the change slope routine 79 illustrated in FIG. 12 is selected.

Figure 7:
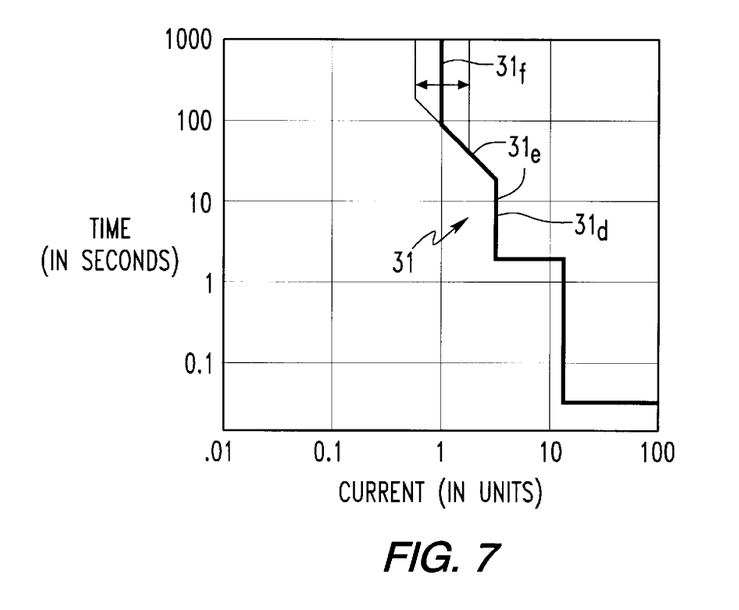
FIG. 7 illustrates manipulation of a vertical segment of a trip curve in a horizontal direction in accordance with the routine of FIG. 6.

FIG. 6 illustrates the horizontal movement routine 69. As the user drags the vertical segment horizontally from its initial position x1, the adjusted position x is tracked at 81. As the value of x changes, the next valid set point x2 in the direction in which the vertical segment is being dragged is determined at 83. If a set point is already at the maximum value as determined at 83, the routine is exited and the curve remains as it was. However, if the set point can be further adjusted in the direction selected, a mid-point between the x coordinate of the initial set point and the x coordinate of the next set point is determined at 87. If the vertical segment has not been dragged past the midpoint as determined at 89, the initial set point is retained. If however, the vertical segment has been dragged past the midpoint between set points, the next set point is selected at 91. This then requires adjusting the remainder of the curve and a redrawing of the curve on the display as indicated at 93. This adjustment of the curve is implemented using the equation above. FIG. 7 illustrates adjustment of the long delay pick-up section of the curve 31$_f$. It can be seen that this results in an adjustment of the adjacent sloped segment 31$_e$ as well as the adjacent vertical segment 31$_d$.

Figure 9:
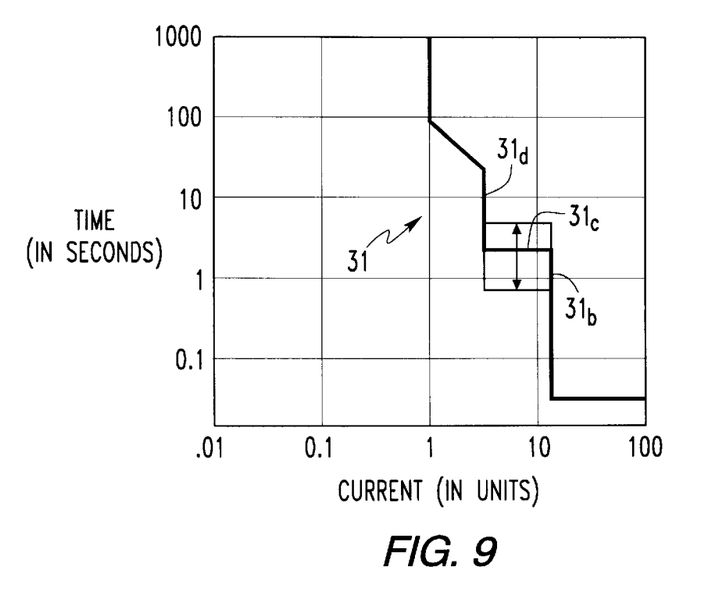
FIG. 9 illustrates adjustment of a horizontal segment of a trip curve through manipulation of a vertical portion using the routine of FIG. 8.

FIG. 8 illustrates the routine 73 used to effect vertical movement when a horizontal section of a curve is selected in the routine 63. As the user drags the selected horizontal segment vertically, from the initial vertical position y1, the y coordinate is tracked as indicated at 95. As the horizontal segment is dragged vertically, the next valid set point is determined at 97. If the set point is already the last than can be selected in the direction in which the segment is being dragged, as determined at 99, the routine is exited. If, however, the set point can be increased in the direction in which the segment is being dragged, the midpoint between the current set point and the next set point and the next set point is determined at 101. If the horizontal segment has not been dragged vertically past the mid point between set points as determined at 103, the routine is exited. However, if the segment has been dragged more than half way between the set points, then y is set to value y2 for the next set point at 105 and the rest of the curve is adjusted and redrawn at 107. FIG. 9 illustrates adjustment of the short delay time segment 31$_c$, which requires adjustment of the segments 31$_b$ and 31$_d$ as well.

Figure 11:
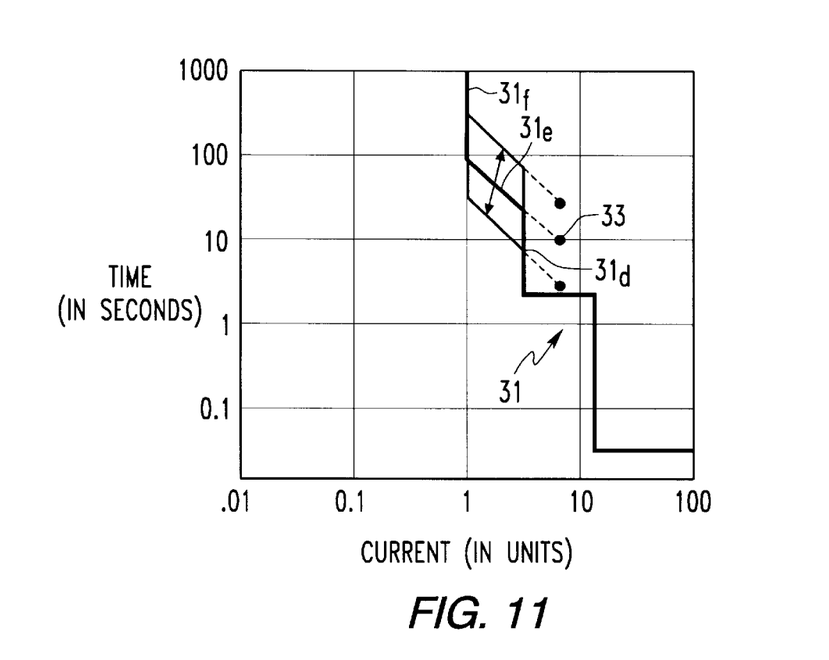
FIG. 11 illustrates adjustment of a diagonal segment of a trip curve using the routine of FIG. 10.

If the sloped section of the curve, 31$_e$, has been selected, the routine 75 is called in FIG. 10. As it will be recalled, this sloped segment 31$_e$ represents the long delay time function. The long delay time which is the time period for which the current can exceed the selected factor times a long delay pick-up value, is represented by the point 33 in FIG. 2. The long delay time is changed by dragging the segment 31$_e$ vertically as shown in FIG. 11 and this movement is tracked at 109 as the change in x from x1 to x and y from y1 to y. The new long delay time period LDT is computed at 111 using the equation shown wherein x, y is the new mouse position 33 as dragged by the user, s is the slope of the segment 31$_e$, and k is a constant. The closest selectable value of LDT available is then determined at 113 from a look up table. If there is no next valid LDT as determined at 115, no change is made in this segment 31$_e$. Otherwise, the long delay time is set to the new value at 117, and the remainder of the curve is adjusted and redrawn at 119. As can be seen in FIG. 11, this includes redrawing the adjustment segments 31$_d$ and 31$_f$.

Figure 13:
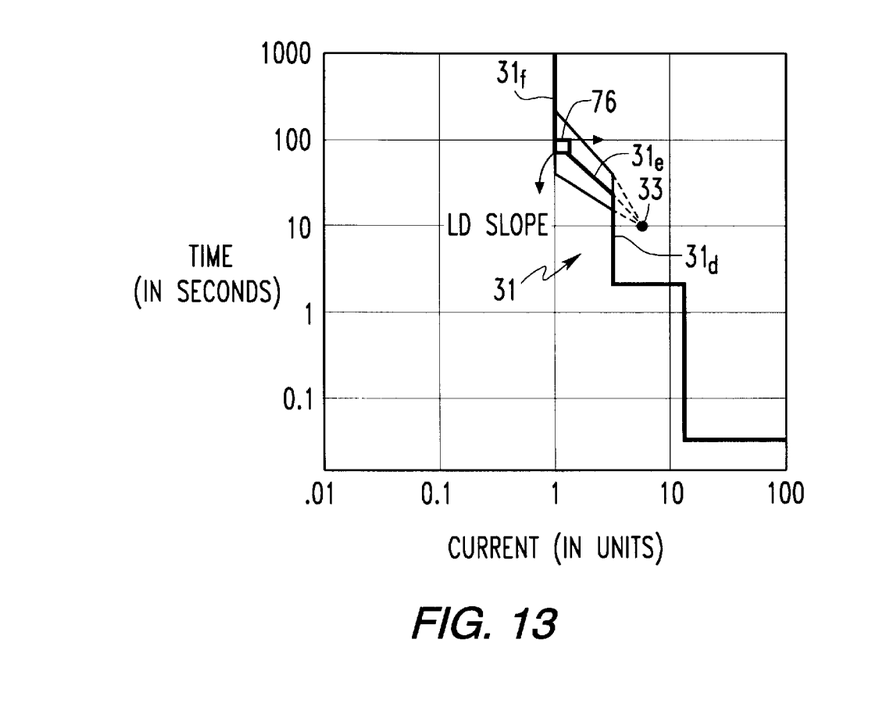
FIG. 13 illustrates adjustment of the slope of the diagonal portion of a trip curve.

The routine 79 for adjusting the slope is shown in FIG. 12. As the user selects the slope adjustor 76 and drags it vertically from its initial position y1 to a new position y. This movement is tracked at 121. If the slope adjuster is dragged downward as determined at 123, the slope is set to the next lower available slope at 125. If on the other hand, the slope adjuster 76 is dragged upward, the next higher available slope is selected at 127. If no additional settings for the slope are available in the direction in which the slope adjuster 76 is being dragged, as determined at 129, no change is made in the slope. If, however, a change in slope is available in the direction the slope adjuster 76 is being dragged, then the rest of the curve is adjusted and redrawn at 131. As shown in FIG. 13, adjustment of the slope results in rotation of the segment 31$_e$ about the long delay time point 33. This also results in adjustment of the segments 31$_d$ and 31$_f$.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for adjusting a trip curve defined by parameter settings for a protection device in an electric power distribution system, said apparatus comprising:

display means;

means for generating a graphical display of said trip curve on said display means from said parameter settings;

adjusting means for graphically manipulating on said graphical display of said trip curve to adjust said trip curve and said parameter settings to generate an adjusted trip curve and adjusted parameter settings; and means outputting said adjusted parameter settings defining said adjusted trip curve.

2. The apparatus of claim 1 wherein said adjusting means for graphically manipulating said graphical display of said trip curve comprises means for dragging said graphical display of said trip curve across said display means.

3. The apparatus of claim 2 wherein said trip curve comprises a plurality of segments and wherein said means for dragging said trip curve comprises means selecting a segment of said trip curve for dragging across said display means, and wherein said adjusting means further includes means adjusting other segments of said trip curve to accommodate for dragging of said selected segment.

4. The apparatus of claim 3 wherein said adjusting means comprises means limiting movement of said selected segment of said trip curve to limiting values for said parameter settings.

5. The apparatus of claim 4 wherein said parameter settings have discrete values and said adjusting means adjusts said adjusted parameter settings to a closest discrete parameter setting for the selected segment.

6. The apparatus of claim 4 wherein said trip curve has a sloped segment having a slope determined by a slope parameter setting, and wherein said adjusting means includes means for graphically manipulating said sloped segment to adjust said slope parameter setting.

7. The apparatus of claim 6 wherein said means for graphically manipulating said sloped segment to adjust the slope of the sloped segment comprises means graphically moving one end of said sloped segment while maintaining the other end of said sloped segment in a fixed position.

8. The apparatus of claim 1 adapted for coordinating trip curves for a plurality of said protection devices wherein said means for generating a graphical display generates a graphical display of each of said trip curves on said display means simultaneously and said adjusting means comprises means for graphically manipulating said graphical display of at least one of said trip curves to adjust said one trip curve and associated parameter settings to provide a margin (M) between said trip curves.

9. The apparatus of claim 8 wherein said means for manipulating said trip curve comprises means for dragging said at least one trip curve across said display means.

10. The apparatus of claim 9 wherein said trip curves comprise segments, and wherein said means for dragging comprise means for dragging one of said segments of said one trip curve.

11. Apparatus comprising:
at least one protection device for an electric power distribution system having parameter settings defining a trip curve for said protection device:
means for adjusting said trip curve comprising:
display means;
means generating a graphical display of said trip curve on said display means from said parameter settings; and
adjusting means for graphically manipulating on said graphical display of said trip curve to adjust said trip curve and said parameter settings to generate an adjusted trip curve and adjusted parameter settings; and communication means for transferring said parameter settings from said protection device to said means for adjusting said trip curve and for retransferring said adjusted parameter settings to said protection device to provide said adjusted trip curve for said at least one protection device.

12. The apparatus of claim 11 including a plurality of protection devices each having parameter settings defining a trip curve, said means for generating a graphical display comprising means for simultaneously generating a graphical display for trip curves on said display means for at least two protection devices including said at least one protection device and another protection device, said adjusting means comprising means for graphically adjusting at least said trip curve of said one protection device relative to the trip curve for said another protection device to coordinate operations of said at least two protection devices; and said communication means comprising means transferring parameter settings of said at least two protection devices to said means for adjusting said trip curves and for retransferring at least said adjusted parameter settings back to said at least one protection device.

13. A method of coordinating trip curves defined by parameter settings of a plurality of protection devices in an electric power distribution system, said method comprising the steps of:

storing stored values of said parameter settings of each of said trip curves;

generating as a display on a display device simultaneous graphical representations of at least two of said trip curves from said stored values of said parameter settings;

graphically manipulating said display of said graphical representation of at least one of said trip curves associated with at least one of said protection devices to an adjusted position to provide margins (M) between said trip curves;

updating said stored values of said parameter settings of said at least one of said trip curves to adjusted values produced by said adjusted position of said one trip curve; and inserting said adjusted values of said parameter settings into said at least one of said protection devices.

14. The method of claim 13 wherein said graphical representations of said at least two of said trip curves comprise a series of line segments and said step of graphically manipulating comprises dragging one of said line segments on said display to said adjusted position.

15. The method of claim 14 wherein said inserting step comprises transmitting said adjusted values of said parameter settings to said at least one protection device over network communications.

16. The method of claim 15 wherein the step of storing comprises transmitting said parameter settings from said plurality of protection devices to storage means over said communications network.

* * * * *